Figure 1:
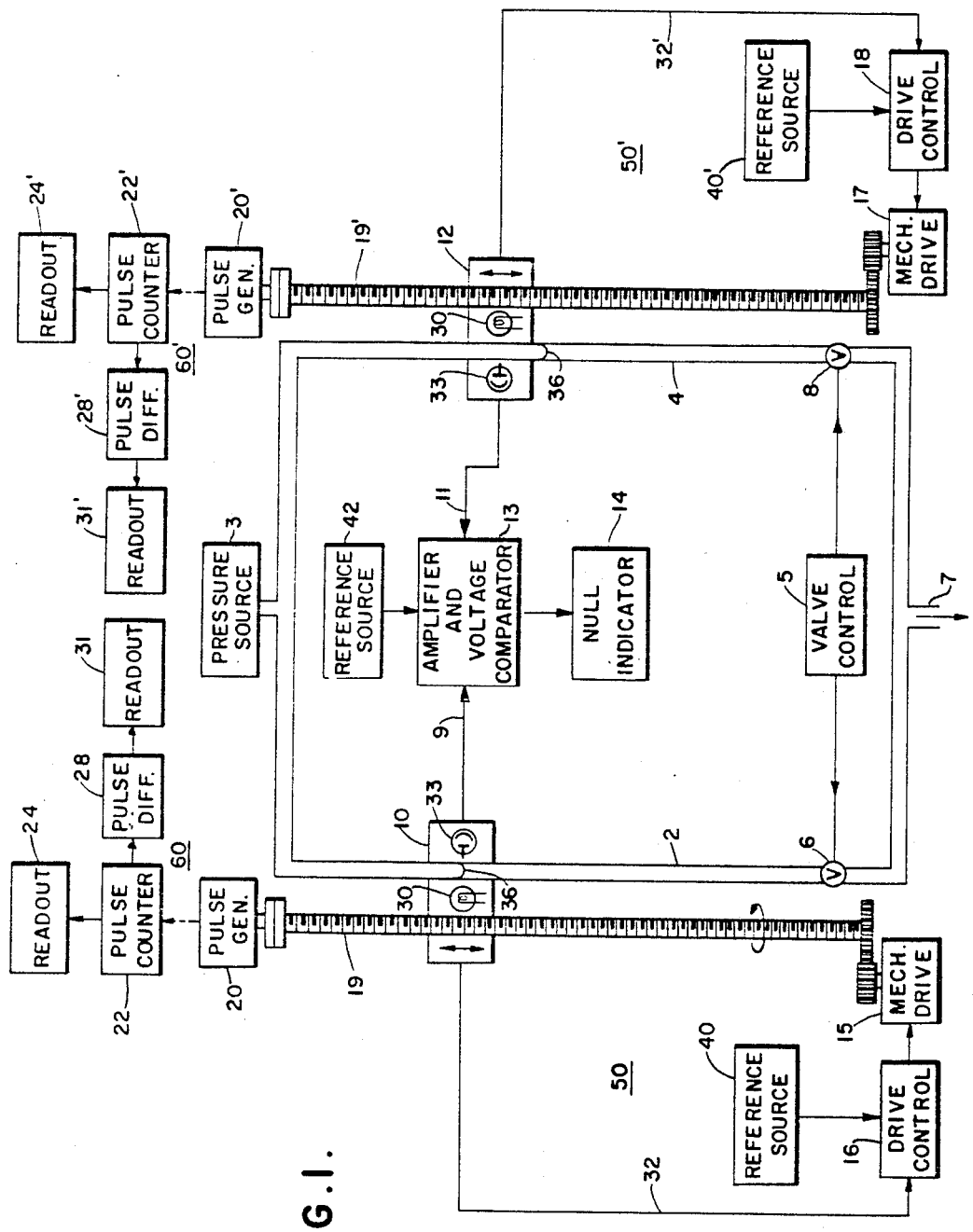

June 11, 1968 D. J. GRANT 3,388,258
FLUID FLOW METER WITH COMPARATOR REFERENCE MEANS
Filed April 5, 1965 2 Sheets-Sheet 2

INVENTOR
Daniel J. Grant
BY
ATTORNEYS

── # United States Patent Office 3,388,258
Patented June 11, 1968

3,388,258
FLUID FLOW METER WITH COMPARATOR
REFERENCE MEANS
Daniel J. Grant, Chevy Chase, Md., assignor to the United
States of America as represented by the Administrator
of the National Aeronautics and Space Administration
Filed Apr. 5, 1965, Ser. No. 445,807
24 Claims. (Cl. 250—218)

The invention described herein may be manufactured and used by or for the Government of the United States of America for governmental purposes without the payment of any royalties thereon or therefor.

This invention relates to a fluid flow meter and more particularly to a photometric flow meter which provides an accurate indication of both the fluid flow and fluid displacement by tracking the meniscus of a fluid as its level changes.

It is desirable in many technical applications that the level of a fluid within a tube to be sensed and the fluid controlled and dispensed from a remote station, either because the fluid is hazardous, e.g., radioactive, toxic, explosive, or because the dispensing device which contains the fluid is not within the physical reach; e.g., the dispensing apparatus may be within an environmental chamber, such as a vacuum chamber. In such cases, if accurate indications of both total fluid flow, that is, the amount of fluid which has been dispensed from a datum point, and the time rate of that flow are terminated to a remote controlling station, it is possible to regulate, from that station, both the rate and the amount of future dispensation of the fluid.

One approach for continuous fluid flow indication is through the use of a photoelectric cell which is activated by a light source, that is, by the use of a photooptical detector. In such a detector, a beam of light is passed through a transparent liquid dispensing tube and focused on the photocell. This optical detector or head is moved by a mechanical drive along the tube so as to "track" the flow. This is possible because the degree of photocell activation will vary in accordance with the optical properties of the fluid present in that portion of the tube which is scanned by the optical detector. Therefore, as the fluid is dispensed from the dispensing tube under the action of a pressurizing medium (dispensing agent), the concave meniscus (the curved top level of the fluid within the dispensing tube) may be "tracked" or followed by noting variations in photocell output as the optical detector is moved along the dispensing tube.

One such prior art system is disclosed in the United States Patent No. 2,980,802, in which the degree of activation of a photoelectric cell is dependent upon the refractive indices of the fluids within a glass dispensing tube.

Although such prior art fluid dispensing systems are capable of tracking or following the moveable meniscus, such systems do not give an accurate indication of the total amount of the fluid or liquid dispensed from a reference point since those systems inherently depend upon an inaccurate reference or datum point. In such systems the level of the liquid, contained with the dispensing tube, varies with environmental changes, such as temperature fluctuations which expand or contract the liquid; and inherently the system is not capable of compensating for the temperature variations. Also, the reference point is usually permanently marked onto the outer portion of the tube and as a consequence does not allow for the remote selection of that point.

Accordingly, it is an object of this invention to provide a photomeric meter which tracks the meniscus of a fluid and accurately indicates the fluid level within a dispensing tube.

It is another object of this invention to provide a photometric flow meter system which accurately indicates the total fluid flow from a reference point and which is susceptible to control from a remote station.

It is yet a further object of this invention to provide a photometric flow meter system which accurately indicates both total flow and flow rate of a fluid.

It is still another object of this invention to provide a method of dispensing fluids and accurately indicating the quantity of fluids dispensed.

The above and further objects of the invention are achieved through the use of a dispensing device containing first and second transparent dispensing tubes. Each tube contains a fluid and has a moveable photometric detector associated with it. The photometric detector contains a photoelectric cell whose electrical output is dependent on the degree of photocell activation from a light source cooperating therewith. These detectors are positioned to move along the respective tubes in response to independent mechanical drives. In addition, they are positioned so that the photoelectric cell and light source of each are on opposite sides of the tube with which they are to cooperate. In this manner, the detectors can "track" the menisci of the fluids within the tubes. The relationship of the fluid level in one tube with respect to the fluid level in the other tube is established by a null indicating means being connected to receive the electrical outputs from both moveable photometric detectors. This null indicating means is used to indicate when the two outputs are equal. The procedure, so far described, fixes a relative reference or datum point of the level of the fluid in one tube with respect to the level of the fluid in the other tube. Now, as the level of the fluid within one of the tubes changes due, for example, to dispensation of fluid through an opened valve, the photometric detector associated with the opened dispensing tube is moved by a mechanical drive along that tube to follow or "track" the change in position of the meniscus of the fluid therein. The amount of longitudinal movement of this "tracking" photometric detector from the relative reference point is noted when the null condition on the null indicating means becomes re-established. Then, with the cross-sectional area of the opened dispensing tube being known, the total amount of fluid dispensed therefrom can be readily determined. Also, the time rate of fluid flow can be calculated by noting the time elapsed in the actual dispensing operation.

Figure 2:
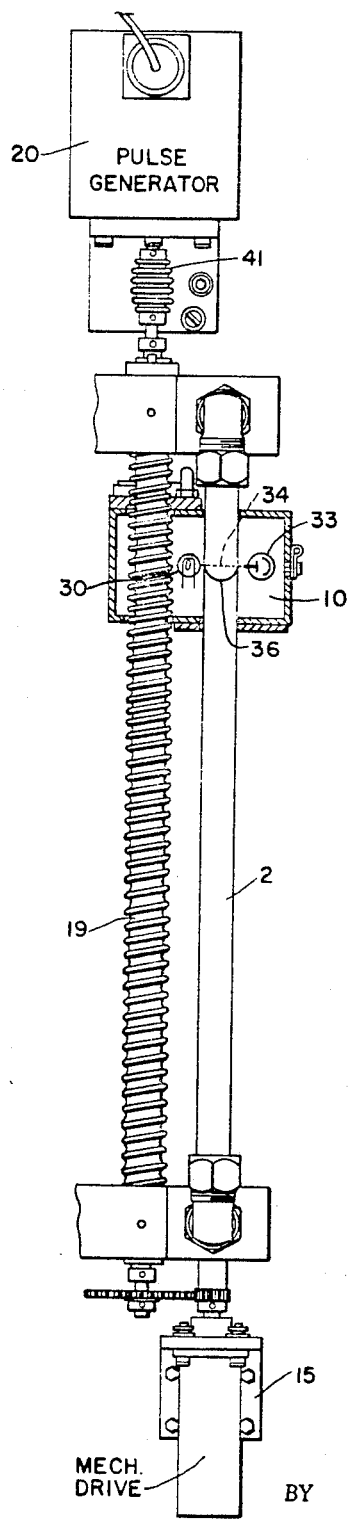

Other objects as well as the advantages and features of the present invention will, of course, become apparent and immediately suggest themselves to those skilled in the art to which the invention is directed from a reading of the following detailed description in connection with the accompanying drawings, in which:

FIGURE 1 is a schematic representation of the photometric flow meter of the present invention; and FIGURE 2 shows a partial front view of a dispensing tube and its associated apparatus of one embodiment of the invention.

General description of the invention

Turning now in detail to FIGURE 1, there is shown, in accordance with the invention, a photometric flow meter for accurately dispensing liquids from a plurality of transparent dispensing tubes 2 and 4. In the particular embodiment, a uniform feed gas pressure source 3 is utilized to regulate the rate of dispensation of liquids through a plurality of valves 6 and 8. By increasing the feed gas pressure the liquid through the dispensing tubes will be dispensed at a faster rate. It should be understood, of course, that the liquid may be dispensed solely due to atmospheric pressure if a positive feed pressure is not desirable in a particular application; and also a gaseous substance and other material which flow under pressure can be used with the disclosed apparatus.

Valves 6 and 8, when open, allow liquid to be dispensed to an outlet 7 for subsequent use in a variety of applications. In the preferred embodiment they are electromagnetic valves which are actuated from a remote location in response to electrical commands from valve control 5. However, any other type of valve, responsive to remote commands, may be used.

One application for a dispensing device of the type shown in FIGURE 1 is in connection with ground testing of various liquid fuels in an experimental rocket. In such testing, precise, yet small amounts of hazardous liquid propellants must be introduced into the rocket, which is fixed to an experimental platform, so that the rocket motor's response can be tested with respect to different types and quantities of fuel. It is evident that the dispensation of the liquid must be done from a remote station and also that the metering of liquid fuels which are fed to the motor must be very precise to obtain accurate data on the motor's response and to the consumption of the liquid fuel supplied.

Photometric detectors 10 and 12, which are described in more detail in connection with FIGURE 2, are positioned for longitudinal movement along the transparent dispensing tubes 2 and 4, respectively, to sense the menisci 36 of the liquids therein and generate signals in accordance with the optical properties thereof. Of course, the liquids within the dispensing tubes need not be of the same composition. The only limitation is that each liquid have approximately the same optical properties so that the voltage levels of the two generated signals will be of approximately the same magnitude when the various menisci are sensed simultaneously.

Signals from photometric detectors 10 and 12 are coupled to the input of a conventional amplifier and voltage comparator circuit 13 via leads 9 and 11, respectively. The amplifier and voltage comparator circuit 13, which can be in the nature of a bridge circuit, e.g., a Wheatstone bridge, is in turn connected to a null indicator 14, which, in the specific application, is to be located at the remote station. This null indicator 14 registers a null or minimum reading only when the voltage levels of the signals on output leads 9 and 11 are approximately equal and of the same polarity, that is, when detector 10 and 12 sense liquids of approximately the same optical properties. In essence, the output level on one lead, e.g., lead 9, is compared to a reference voltage level, which conveniently is the voltage level on lead 11. While it can readily be seen that either tube can act as the reference for the other by the output voltage from the photometric detector associated therewith acting as the reference voltage level, it is evident, however, that the reference voltage level could be an independent voltage source against which each voltage level (the voltage on either leads 9 and 11) could be compared.

The following indicates how such an independent source could be arrived at. For example, the output voltage level on lead 9, when photometric detector 10 senses the meniscus of the liquid in tube 2, is substantially equal to the output voltage level on lead 11, when the meniscus in tube 4 is sensed by photometric detector 12. This is evident because it is assumed the light sources of the photometric detectors are of substantially equal quality. Now, once the voltage level (magnitude) on one of the leads is determined, i.e., the voltage level at which the meniscus is sensed, an output voltage of that magnitude from a reference voltage source 42 is inserted, as shown in FIGURE 1, into the amplifier and voltage comparator circuit 13 in place of the output from one of the leads. Then, the voltage level on either lead 9 or 11 can be compared to the voltage level at the output of reference voltage source 42 rather than being compared to each other.

Such a procedure allows a liquid to be accurately dispensed using only a single tube, i.e., the second tube is not required to act as a reference. In fact the second tube is then able to dispense a liquid itself since the output level of one photometric detector does not need to constantly serve as a reference for the other. The output voltage from each photometric detector need only be compared with a reference voltage of a proper magnitude in amplifier and voltage comparator circuit 13, and the output therefrom be applied to null indicating means 14, which indicates when a balance is achieved.

The photometric detectors 10 and 12 are movable in either longitudinal direction on lead screws 19 and 19', respectively. Each of these lead screws are so located that the axis thereof is parallel with the axis of the dispensing tube with which it is associated. The drive mechanisms for lead screws 19 and 19' are mechanical drives 15 and 17, respectively. Drive controls 16 and 18, are used to control mechanical drives 15 and 17, respectively, and thereby regulate the movement of the lead screws. Connected to drive controls 16 and 18 are reference voltage sources 40 and 40', respectively. The use of the reference voltage sources will be discussed in more detail hereinafter. Each is set to be equal to the output voltage from the detector with which it is associated when the meniscus is sensed.

In the application of the invention discussed above, the drive controls 16 and 18 would be located at the remote station, and the mechanical drives 15 and 17 would be variable speed motors which are capable of rotating lead screws 19 and 19', respective, at a variable rate. As leads screws 19 and 19' rotate, the photometric detectors 10 and 12, are moved along the dispensing tubes 2 and 4. It is noted that each photometric detector has an independent mechanical drive and drive control. This allows for independent tracking of either meniscus within either dispensing tube.

By applying the outputs from photometric detectors 10 and 12 to drive controls 16 and 18, via leads 32 and 32', respectively, mechanical drives 15 and 17 (variable speed motors), operated by drive controls 16 and 18, respectively, control lead screws 19 and 19' so that their rotation depends upon the rate at which liquid is dispensed from the tubes with which they cooperate. In essence, then, lead 32, drive control 16, mechanical drive 15 and lead screw 19 cooperate to form a servo feedback loop 50 which positions photometric detector 10 in accordance with the position of the meniscus of liquid in tube 2. Similarly, lead 32', drive control 18, mechanical drive 17 and lead screw 19' cooperate to form a servo feedback loop 50' which positions photometric detector 12 in accordance with the position of the meniscus of the liquid in tube 4. Each of these servo feedback loops operate such that the magnitude of the output voltage of the photometric detector associated therewith, upon being compared in the drive control circuit with the voltage level of the reference source associated therewith, determines the running speed of the variable speed motor of the associated mechanical drive. Of course, the output applied to leads 32 and 32' from the detectors 10 and 12, respectively, are the same outputs that are present on output leads 9 and 11, respectively.

Servo feedback loops 50 and 50' function to automatically control the position of photometric detectors 10 and 12, respectively, along tubes 2 and 4 in accordance with the position of the menisci of these tubes. Thus, when the output of one of the photometric detectors indicates that the detector is not sensing a meniscus, i.e., the amplitude of the output from the detector is not at some predetermined value which relates to the optical properties of the meniscus, the speed of the motor associated with that detector will be increased due to the voltage level increasing at the output of the detector so as to drive the moveable detector along the tube until the meniscus is again sensed. In this manner, "instantaneous" tracking of the various menisci is accomplished.

Liquid displacement indicating means 60 and 60', connected to lead screws 19 and 19', respectively, register the amount of movement in either longitudinal direction, of photometric detectors 10 and 12, respectively, from their reference positions. Liquid displacement indicating means 60 includes a pulse generator 20 mechanically coupled to lead screw 19; a high speed pulse counter 22 electrically coupled to pulse generator 20; and a readout means 24 electrically connected to pulse counter 22 to provide a display indicative of the amount of movement of photometric detector 10 from the reference position. Similarly, liquid displacement indicating means 60' includes pulse generator 20' mechanically coupled to lead screw 19'; high speed pulse counter 22' electrically coupled to pulse generator 20'; and a readout means 24' electrically connected to pulse counter 22' to provide a display indicative of the amount of movement of photometric detector 12 from the reference position.

In a specific application, pulse generator 20 provides an outburst of 200 pulses in response to each complete revolution of the lead screws 19. Also in this specific example, each revolution of lead screw 19 mechanically moves photometric detector 10 .200 inch; therefore, the amount of movement of the photometric head 10 may be determined by counting the total number of times a burst of pulses is emitted by the pulse generators. This amount is counted on high speed counter 22 and displayed on readout 24—both of which are located at the remote station.

Should the particular application be limited to an embodiment in which only one photometric detector 10 or 12 is moved at any one instant, there is no necessity for a plurailty of pulse counters 22, 22' and readouts 24 and 24'. Only one counter and readout need be employed when the application calls for movement of only one detector at one particular time.

The mode of transmission between the pulse generators 20, 20' and the remote station, which contains the pulse counters 22, 22', may be of any conventional type. The pulse bursts from the pulse generators may be transmitted, for example, by wire or by modulated or unmodulated waves. Of course, this discussion of the manner of transmission is pertinent also to the manner in which commands are transmitted from the remote station to activate the valves 6 and 8 through valve control 5.

By including in each of the readout means 24, 24' a conventional multiplying circuit (not shown) and applying thereto a signal equivalent to the cross-sectional area of the dispensing tube, with which it is associated, and the output from the pulse counter, formed as a voltage equivalent to the displacement of the fluid in the same dispensing tube, the readout means can be used to display the quantity of liquid dispensed by the tube. Should it further be desired that the rate of flow be indicated directly, then readout means 24, 24' would also include a conventional divider circuit (not shown) which would have coupled thereto the output from the multiplying circuit and a signal equivalent to the time it takes to dispense the measured quantity of liquid.

One example of how the duration of the liquid flow can be obtained is through the use of a timing circuit (not shown) which could be connected to be activated by valve control 5 at the time time as it controls the opening and closing of valves 6 and 8. For example, a start command signal from valve control 5 could be used to start the timing circuit at the instant the valve associated therewith is opened; and a stop command signal from valve control 5 could be used to stop the timing circuit at the instant the valve associated therewith is closed. Should it be desired that a voltage be derived which relates to the elapsed time that the valve was opened, then, for example, a charging circuit or voltage storing means (not shown) could be connected to valve control 5 to receive the start and stop command signals and thereby have its charging or storing period controlled. The voltage stored during the elapsed period would be indicative of that period and could be applied to the divider circuit (referred to above in connection with using readout means 24, 24' to directly indicate flow rate) and used therein to compute the flow rate of that quantity of liquid that is dispensed during the period when the charging or storing takes place.

It is also possible to determine the time rate of fluid dispensation by determining, with respect to time, the rate at which pulse bursts are transmitted to the counters 22, 22'. This is accomplished through the use of conventional pulse differentiators 28, 28' and additional readouts 31, 31' connected as shown in FIGURE 1. In a specific embodiment, in which a variable speed motor is used to move photometric detector 10 along the dispensing tube 2 and in which the meniscus is "instantaneously" tracked, if the rate at which the fluid is dispensed increases, the photometric detector will be moved along the tube at an increased rate due to servo feedback loop 50. This results in an increase in the rate at which pulse bursts are transmitted from pulse generator 20 to counter 22. By differentiating the pulse bursts with respect to time, by pulse differentiator 28, and by noting this time rate in numerical form on readout 31, an accurate indication of time rate of fluid flow is possible. Of course, in the noted embodiment, the pulse differentiator 28 and readout 31 are also located at the remote station. Also, whether a separate pulse differentiator and counter should be used for each dispensing tube is dependent upon the same considerations as discussed above in relation to the used of a separate pulse counter for each tube—separate pulse differentiators are to be used if the various detectors are to "track" simultaneously.

Also constant speed motors may be used to drive the photometric detectors along the tubes. In such an application, the "instantaneous" time rate of fluid dispensation will not be available since the photometric detectors 10 and 12 will move up and down along the dispensing tubes at a constant speed, and the rate indicated to the remote station will not vary with time.

The particular embodiment described above indicates that digital pulses are transmitted to the remote station. However, analog information or any other type of signal which is capable of indicating the distance traveled by the "tracking" photometric detector may be transmitted back to the remote station. This embodiment is also described as including a remote controlling station. However, each of the controls which are responsive to remote commands may be activated by a station contiguous to the dispensing device.

*Brief description of the photometric detector as used in the invention*

FIGURE 2 depicts in detail one of the photometric detectors, detector 10, used to sense a concave meniscus 36 within the transparent dispensing tube 2. A light source 30, which emits a beam of light 34, is positioned within the photometric detector 10 so that the beam 34 passes through the transparent precision bore dispensing tube 2 and focuses on a photocell 33. The meniscus 36 of the liquid contained within the dispensing tube 2 is sensed by noting variations in photocell activation as the photometric detector 10 is moved up and down along the tube in response to the rotation of lead screw 19. Also shown in FIGURE 2 is a flexible coupling means 41 to allow for a slight misalignment in the coupling of lead screw 19 to pulse generator 20.

It should be noted that it is not critical which portion of the meniscus is used as the reference point, since each portion thereof will provide a discrete reading. In addition, while the meniscus is shown as being concaved, a convexed meniscus can be sensed equally as well by the photometric detector. Therefore, the invention has application with all fluids. Also, the configuration of the dispensing tube and associated detector is not limited to an optical detector device for sensing opaque liquids within a transparent tube. Other arrangements are feasible as long as the position of the liquid level may be sensed by the moveable detectors, i.e., while the dispensing tube may be physically opaque, it must be transparent to the detecting means. For example, the detectors may be magnetic coils whose output characteristics are altered when a metallic slug, floating at the surface of the liquid, is positioned relative to it.

*Filling the dispensing tubes*

Before operation, both tubes of the dispensing device are filled with the liquid which is to be dispensed. This may be accomplished, for example, by opening valves 6 and 8 and by minimizing the effect of the pressure source 3. Then the liquid may be forced up through the valves 6 and 8 from outlet 7 until the dispensing tubes 2 and 4 are substantially filled.

Of course, less elaborate methods of filling the tubes may be derived. For example, the liquid may be poured manually into the tubes from the vicinity of the pressure source via auxiliary openings. However, in the particular embodiment shown in the figures the liquid was hazardous and a "forced" filling through outlet 7 was more desirable since the filling process could thus be accomplished from a remote station.

After the tubes are filled to a desired level, valves 6 and 8 are closed in response to commands from valve control 5 so as to prevent the dispensation of liquid; and the source of liquid is disconnected from outlet 7.

*Determining the reference point*

In operation, a relative reference or detection point is established by mechanically moving photometric detectors 10 and 12 up and down along tubes 2 and 4, respectively, until each detector simultaneously senses a portion of the meniscus within the tube such that outputs from leads 9 and 11 are equal in magnitude as indicated by a zero reading on null indicator 14. When this null position is achieved, pulse counter 22, at the remote station, is adjusted to a predetermined or zero setting. This establishes the relative position of one detector with respect to the other. It can readily be observed, as long as photometric detectors 10 and 12 can be varied in position relative to the menisci associated therewith to provide equal outputs from leads 9 and 11, that photocells, light sources and fluids do not have to be perfectly matched to provide precision measurement.

*Dispensing operation*

Once the relative datum point is established and pulse counter 22 is adjusted to the proper setting the active dispensing operation is commensed. Valve 6 within tube 2 is opened by a command signal from valve control 5. In this manner, liquid within this tube is distributed to outlet 7. As the level of the meniscus of the liquid in tube 2 changes, photometric detector 10 is moved to follow the change therein. This movement of the detector 10 is accomplished by the rotation of lead screw 19 in response to the mechanical drive 15 which is in turn controlled by drive control 16 in accordance with signal fed thereto from detector 10 via lead 32.

The movement of lead screw 19 causes pulse generator 20 to generate a series of pulse bursts which are transmitted to pulse counter 22. The output from pulse counter 22 is then applied to readout 24 which displays the amount of longitudinal movement of the photometric detector from the reference point. The total amount of flow from the arbitrary reference point can then be calculated since it is assumed the cross-sectional area of the dispensing tube is known, and since the amount of longitudinal movement of the photometric detector from the reference point, as displayed on the readout, is an accurate indication of the total "drop" in liquid level from that reference point.

Should the quantity of liquid dispensed by tube 2 be insufficient for the desired use, valve 6 should be closed before all the liquid has been dispensed. In this manner, detector 10 is still properly aligned with the meniscus of liquid in tube 2. Now, by opening valve 8, servo feedback 50' and liquid displacement indicating means 60' operate to position photometric detector 12 with respect to the meniscus of the liquid in tube 4 and to indicate the amount of longitudinal movement of photometric detector 12, respectively, in the manner described more fully above in connection with the measure of the flow of liquid from tube 2.

In a practical embodiment of the dispensing device, limit switches (not shown) were utilized to prevent the tracking detectors from traveling past set positions on the tubes. In addition, tubes having relatively small bores, 1/10 inch to 2 inches in diameter, have been used. The actual dimensions of the tubes, however, depend upon the amount of liquid to be dispensed. Also, while the invention is described in connection with the use of two dispensing tubes, the same principle of operation will work equally as well with a plurality of tubes.

While in the preferred embodiment the system is operated in an up-right position, it need not be placed in such a position because feed pressure source 3 allows for dispensation of liquid independent on the force of gravity.

Although the liquid may expand or contract there is no change in the shape of the menisci of the liquids in the two tubes with respect to each other. Accordingly, should there be any temperature variations in the liquids, temperature compensation can be affected and the accuracy of the system can be maintained by alternately referencing between the two tubes as the liquids are dispensed therefrom.

The advantages of this system are numerous since the entire operation may be controlled from a remote station. In addition, since an accurate indication of total liquid flow from an arbitrary reference point is achieved, delicate dispensing operations in a variety of ambient conditions may be performed without detracting from the simplicity of the system.

So far the invention has been discussed in connection with dispensation of liquids to an outlet; however, the photometric system of this disclosure is not so limited. For example, the plurality of photometric detectors may be used in a McLeod gauge to permit accurate readings of vacuum pressures. In such an application, the liquid level of the reference column, with respect to the level of the column under test, may be determined by dual tracking of the two menisci. In such a case, simultaneous tracking of each level may be advantageous. If this dual tracking is desirable, a plurality of pulse counters 22, 22' and readouts 24, 24' may be used (one for each tube); also a reference voltage source may be used so that one detector does not have to remain static to serve as the reference for the other detector.

Although the foregoing disclosure relates essentially to a preferred embodiment of the invention, it is obvious that numerous modifications and alterations, some of which have been discussed briefly, may be made without departing from the spirit and scope of the invention set forth in the appended claims.

What is claimed is:

1. An apparatus for sensing the relative position of a fluid within a tubular member comprising: level sensing means positioned for independent longitudinal movement along said tubular member and for generating an output in accordance with its position relative to the level of said fluid within said tubular member, reference means being adjustable for providing an output equal to the output from said level sensing means when said level sensing means is positioned to have a particular relationship with respect to the level of said fluid, comparator means connected to receive the outputs from said level sensing means and said reference means for providing an output which is the measure of the relationship between the inputs applied thereto, and indicating means connected to have applied thereto said output from said comparator means.

2. The apparatus of claim 1, further comprising a drive means coupled to said level sensing means for moving said level sensing means so that it senses the level of said fluid in said tubular member.

3. The apparatus of claim 2, further comprising a display means coupled to said drive means for displaying the amount of movement of said drive means as a measure of the change in level of said fluid.

4. The apparatus of claim 3, wherein said level sensing means is a photometric detector, said tubular member is transparent and said outputs are electrical signals.

5. An apparatus for sensing the relative position of a fluid within a tubular member comprising: level sensing means positioned for independent longitudinal movement along said tubular member and for generating an output in accordance with its position relative to the level of said fluid within said tubular member; reference means being adjustable for providing an output equal to the output from said level sensing means when said level sensing means is positioned to have a particular relationship with respect to the level of said fluid; comparator means connected to receive the outputs from said level sensing means and said reference means for providing an output which is the measure of the relationship between the inputs applied thereto; and a drive means, connected to have applied thereto said output from said comparator means, for moving said level sensing means in accordance with said output applied thereto.

6. The apparatus of claim 5 further comprising display means coupled to said drive means for displaying the amount of movement of said drive means as a measure of the change in level of said fluid.

7. The apparatus of claim 6 wherein said level sensing means is a photometric detector, said tubular member is transparent and said outputs are electrical signals.

8. Apparatus for sensing the menisci of fluids within two tubes comprising: first and second tubes; first and second meniscus sensing means, each being positioned for independent longitudinal movement along said first and second tubes, respectively, and having outputs therefrom; first and second mechanical drive means connected to said first and second meniscus sensing means, respectively, for moving said meniscus sensing means along said tubes; first and second reference sources, each having outputs; and first and second comparing means having respectively connected thereto said outputs from said meniscus sensing means and said outputs from said reference sources and having first and second control outputs, said first control output being indicative of a comparison in the magnitude between the outputs of said first meniscus sensing means and said fish reference source, and said second control output being indicative of a comparison in the magnitude between the outputs of said second meniscus sensing means and said second reference source, said first and second control outputs being connected to said first and second mechanical drive means, respectively, for operating said mechanical drives to control the movement of said respective meniscus sensing means.

9. Apparatus of claim 8 further comprising first and second indicating means connected to said first and second mechanical drive means, respectively, for indicating the amount of longitudinal movement of said first and second meniscus sensing means, respectively, and thereby indicating the total amount of fluid level movement in the respective tube with which it cooperates.

10. The apparatus as described in claim 9 wherein said first and second tubes are transparent to light; said first and second meniscus sensing means are photometric detectors including a light source and a photoelectric cell; and said outputs from said deector means, said reference source, and said comparing means are electrical signals.

11. Apparatus for estabilshing an arbitrary reference point for fluids to be dispensed, comprising: first and second dispensing tubes; first and second detecting means having outputs and positioned for independent longitudinal movement along said first and second dispensing tubes, respectively; and an indicating means connected to said detecting means for comparing said outputs from said detecting means and indicating when said outputs are of approximately the same magnitude, whereby the meniscus of the fluid within said first dispensing tube with respect to the meniscus of the fluid within said second dispensing tube can be determined, when said first and second detecting means are positioned at the menisci of the fluids within said first and second dispensing tubes, respectively, by said indicating means indicating when said outputs applied thereto are approximately the same magnitude.

12. Apparatus as described in claim 11 further including first and second mechanical drive means connected to said first and second detecting means, respectively, for moving said detecting means; and a command control means connected to said mechanical drive means so that said mechanical drive means, in response to a command applied thereto from said command control means, moves said detecting means along said respective dispensing means, whereby a reference level of the meniscus of the fluid within said first dispensing means with respect to the meniscus of the fluid within said second dispensing means can be selected by the operation of said command control means.

13. Apparatus as described in claim 12 further including a remote station for supplying said command from said command control means to said mechanical drive means.

14. Apparatus as described in claim 13 wherein said detecting means are photometric detectors, said dispensing tubes are transparent and said outputs are electrical signals.

15. Apparatus for dispensing liquids from a reference point, comprising: first and second transparent dispensing means; first and second valves connected at an end of said first and second dispensing means, respectively; first and second photometric detecting means positioned for independent longitudinal movement along said first and second dispensing means, respectively; mechanical drive means for independently moving said first and second photometric detecting means in a longitudinal direction along said first and second dispensing means, respectively; and means connected to said first and second photometric means for establishing a reference point for a liquid level within said first dispensing means with respect to a liquid level within said second dispensing means.

16. Apparatus as described in claim 15 wherein said last named means comprises a comparator and a null indicator, said comparator being connected to said photometric detecting means, and said null indicator being connected to said comparator, whereby said null indicator registers a null position when the menisci of said liquids within said first and second dispensing means are simultaneously sensed by said first and second photometric detecting means.

17. Apparatus as described in claim 16 further including a valve control means connected to said valves for opening and closing said valves, and display indicating means connected to said mechanical drive means, whereby the longitudinal movement of said first photometric detecting means from said established reference point is displayed on said display indicating means in accordance with the movement of said mechanical drive means cooperating therewith as said first photometric detecting means is moved thereby in following the meniscus of said liquid within said dispensing means as the liquid is dispensed therefrom when said first valve is opened by said valve control means.

18. Apparatus as described in claim 17 wherein said indicating display means includes pulse generators connected to said mechanical drive means for emitting a series of pulses in response to movement of said photometric detecting means, and counter means connected to said pulse generators for counting the total number of pulses which are emitted from said pulse generators.

19. Apparatus as described in claim 18 further including command control means connected to said mechanical drive means for controlling said mechanical drive means, whereby said photometric detecting means are moved in response to command from said command control means.

20. Apparatus as described in claim 19 further including differentiating means connected to said counter means for supplying an output which is a measure of the time at which pulses are received by said counter means, whereby the flow rate with respect to time, from an established reference point, can be indicated.

21. Apparatus for sensing the menisci of fluids within a plurality of dispensing tube comprising: a plurality of dispensing tubes; a plurality of meniscus detector means equal in number to said plurality of dispensing tubes, a single detector being positioned for independent longitudinal movement along each of said dispensing tubes and having an output therefrom; a plurality of mechanical drive means equal in number to said plurality of said meniscus detector means, a single drive means being connected to each meniscus detector means for moving said detector means along said respective dispensing tube; a plurality of reference sources, each having an output; and a plurality of comparing means, each having connected thereto the output from a single detector means and the output from a reference source, said plurality of comparing means having a plurality of control outputs equal in number to said plurality of detector means, said plurality of control outputs being indicative of a comparison in the magnitude between the outputs of one of said plurality of detector means and one of said reference sources, each of said plurality of control outputs being connected to a respective one of said plurality of mechanical drive means.

22. Apparatus of claim 21 further comprising a plurality of indicating means equal in number to said plurality of dispensing tubes, each being connected to one of said mechanical drive means for indicating the amount of fluid level movement in the respective tube with which it cooperates.

23. The apparatus as described in claim 22, wherein said plurality of dispensing tubes are transparent to light; said plurality of detector means are photometric detectors, each including a light source and a photoelectric cell; and said outputs from said detector means, said reference sources, and said comparing means are electrical signals.

24. The apparatus as described in claim 22 further including a pressure source coupled to said plurality of dispensing tubes for applying pressure to said fluids within said tubes.

References Cited
UNITED STATES PATENTS
2,555,674  6/1951  Carrick _____ 250—218

RALPH G. NILSON, *Primary Examiner.*

M. ABRAMSON, *Assistant Examiner.*